United States Patent
Rayner

(10) Patent No.: US 8,007,162 B2
(45) Date of Patent: Aug. 30, 2011

(54) DIGITAL POSITIONING SLURRY SYSTEM

(76) Inventor: Richard Rayner, Folsom, CA (US)

( * ) Notice: Subject to any disclaimer, the term of this patent is extended or adjusted under 35 U.S.C. 154(b) by 352 days.

(21) Appl. No.: 12/378,096

(22) Filed: Feb. 12, 2009

(65) Prior Publication Data

US 2010/0174416 A1    Jul. 8, 2010

Related U.S. Application Data

(60) Provisional application No. 61/204,522, filed on Jan. 8, 2009.

(51) Int. Cl.
*B28C 7/06* (2006.01)
(52) U.S. Cl. .......................... 366/17; 366/34
(58) Field of Classification Search ............. 366/16, 366/17, 34
See application file for complete search history.

(56) References Cited

U.S. PATENT DOCUMENTS

| | | | |
|---|---|---|---|
| 6,484,079 B2 * | 11/2002 | Buckelew et al. | 701/29 |
| 7,802,737 B2 * | 9/2010 | Rayner | 239/172 |
| 2008/0144424 A1 * | 6/2008 | Schumacher et al. | 366/3 |
| 2008/0316856 A1 * | 12/2008 | Cooley et al. | 366/142 |

* cited by examiner

*Primary Examiner* — David Sorkin

(57) ABSTRACT

A system to provide an efficient, faster, and consistent slurry material application through utilizing a digital positioning receiver and micro controller as means for adjusting output flow rates and percentages of the individual materials within the slurry recipe.

This slurry control system consists of a digital positioning receiver for means of sensing vehicle speed, a hydraulically motor controlling the aggregate and emulsion, an electronic liquid additive flow meter, an electronically controlled water flow meter, a dry additive hydraulic motor, an adjustable display, a dedicated prime mover and pump, and a programmed micro controller to proportionally control each material of the slurry recipe to accomplish each of their target output flow rates and percentages.

1 Claim, 1 Drawing Sheet

DIGITAL POSITIONING SLURRY SYSTEM

CROSS REFERENCES TO RELATED APPLICATIONS

This application claims priority to provisional patent application No. 61/204,522 filed on Jan. 8, 2009.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to a slurry material control system, and in more particularly to integrate a digital positioning receiver consisting of a global positioning system (GPS) or Horn Radar as means for vehicle speed sensing and a programmed micro controller to control the output flow rates and percentages of the individual slurry material components for a responsive flow control system.

2. Description of the Related Art

A slurry machine having means of maintaining a correct material application rate through human manipulated vehicle speed and a target slurry material recipe is a commonly utilized system. Such a system will generally be integrated with a vehicle and include a dedicated prime mover, individual material tanks for aggregate, emulsion, water, liquid additives, and dry additives, hydraulic and electric components to deliver those materials, and means for controlling the target slurry recipe for application.

However, a disadvantage with many slurry systems relates to the efficiency, rate and consistency in applying the material. The past slurry inventions do not incorporate the speed of the vehicle with the material application rate of the slurry material. In most vehicle speed sensing applications, speed sensing is commonly accomplished at the wheel of the vehicle via encoder, or simply via human communication.

Digital positioning receivers such as GPS and horn radar are proven to be a reliable technology. The invention integrates a digital positioning receiver as means for speed sensing, which provides wireless speed sensing capabilities. A digital positioning receiver eliminates the steps of sizing specific wheel diameters and physically integrating the spray system into the vehicle.

In relation to regulating product flow, rather than having independent material flow and vehicle speed, the present invention utilizes digital positioning speed sensing to control the flow of the slurry recipe and application rate. This can be accomplished through a programmed micro controller having input target material rates and percentages. When the slurry vehicle is in motion, the micro controller will use the input digital receiver vehicle speed sensing and have the mechanical components and electrical components controlling the individual materials proportionally react to reach each target rate and percentage. This allows for more efficient and faster application of the slurry material while providing consistent flow. This system will also allow for decreased human error from the operator.

SUMMARY OF THE INVENTION

The object of the present invention is to provide an efficient, faster, and consistent slurry material application through utilizing a digital positioning receiver and micro controller as means for adjusting output flow rates and percentages of the individual materials within the slurry recipe.

This slurry control system consists of a digital positioning receiver for means of sensing vehicle speed, a hydraulically motor controlling the aggregate and emulsion, an electronic liquid additive flow meter, an electronically controlled water flow meter, a dry additive hydraulic motor, an adjustable display, a dedicated prime mover and pump, and a programmed micro controller to proportionally control each material of the slurry recipe to accomplish each of their target output flow rates and percentages.

DETAILED DESCRIPTION OF PREFERRED EMBODIMENT

Figure 1:
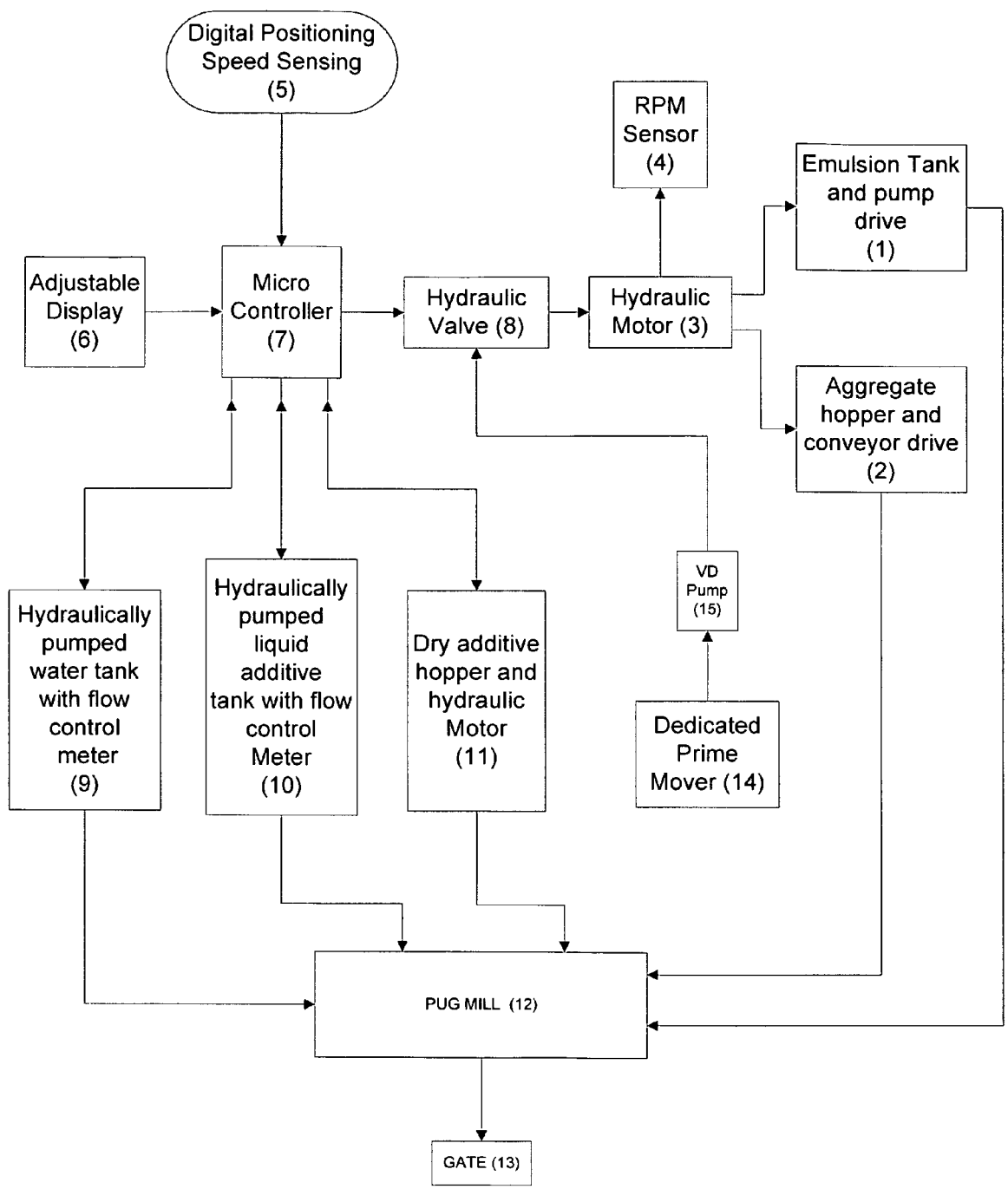
FIG. 1 is a schematic block diagram showing the process of the system and components.

FIG. 1 diagrams the process of the slurry material control system. The primary object of this system is to meet a target material application rate of slurry material while the slurry machine is moving at different speeds. This process starts with individual parts of the slurry recipe stored in their individual tanks having individual means of flow control, a hopper for aggregate with a hydraulic motor controlled conveyor (2), an emulsion tank with a drive pump powered by the aggregate hydraulic motor for simultaneous flow (1), a tank for water that is hydraulically pumped with an electronic flow control meter (9), a tank for liquid additives that is hydraulically pumped with an electronic flow control meter (10), and a hopper for dry additives with a hydraulic motor as means for flow control (11). This material flow is regulated to meet individual target spray application rates and percentages, and is responsive to inputs from a digital positioning speed sensor (5) and the program within the micro controller (7).

The digital positioning sensor (5) and RPM sensor (4) inputs are fed into a micro controller (7) where the information is used within a custom software program to provide a measured output of the materials and is adjusted proportionally to the speed of the slurry machine. While 1 rpm of the hydraulic motor(3)=(X) volume amount of aggregate and emulsion, the other individual material flow rates for water, liquid additive and dry additive are based off a percentage of the aggregate flow rate. These percentage rates of the other material components are computed by the user through trial and error depending on the desired slurry recipe. In addition, the micro controller (7) uses a base or minimum signal to the hydraulic proportional valve (7). This valve adjusts the flow of hydraulic fluid to the hydraulic motor (3) which controls the flow of aggregate and emulsion.

Using the adjustable display (6) the user can adjust the target volume of aggregate and the corresponding percentage rates of the individual materials. The micro controller will then take the input information from the user and the input digital positioning speed sensing information and compute the necessary motor rpm and other individual material percentage rates to meet the target input volume.

All the materials are mixed in the pug mill (12) and flow out the material gate (13). The dedication prime mover (10) and variable displacement pump (11) provides power to the system.

What is claimed is:

1. A self-contained vehicle mounted slurry flow control system, comprising:
   - an aggregate material storage hopper;
   - an emulsion storage tank;
   - a water storage tank;
   - a liquid additive storage tank;
   - a dry additive hopper;
   - a digital positioning receiver consisting of a global positioning system (GPS) or Horn Radar for wirelessly sensing a speed of a vehicle to which the slurry control system is mounted;
   - a hydraulic motor controlling the said aggregate and emulsion flow rate;
   - a liquid additive flow meter, water flow meter and dry additive hydraulic motor;
   - a multiplicity of RPM sensors for sensing the rotation of said hydraulic motors;
   - an adjustable display;
   - a dedicated prime mover and pump;
   - a microcontroller;
   - wherein said microcontroller receives input information from said digital positioning receiver regarding the speed of the vehicle to which the slurry flow control system is mounted;
   - wherein said microcontroller receives input information from said multiplicity of RPM sensors to determine output flow rates of said liquid additive, water, dry additive, aggregate and emulsion; and
   - wherein said microcontroller proportionally adjusts the output flow rates of said liquid additive, water, dry additive, aggregate and emulsion based on the input information from said multiplicity of RPM sensors and said digital positioning system in order to meet a predetermined target flow rate.

* * * * *